May 14, 1929.　　　A. S. KNOX　　　1,712,889
CAMBER MEASURING DEVICE
Filed Dec. 5, 1927
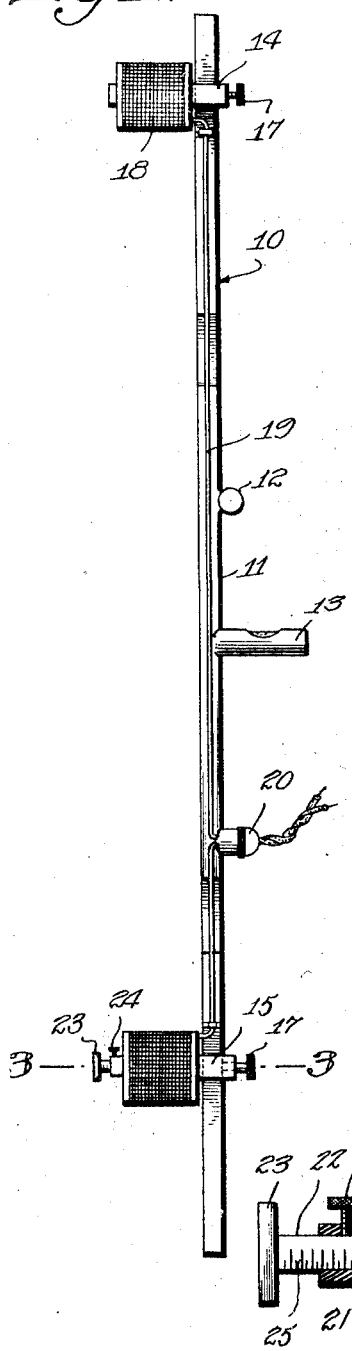
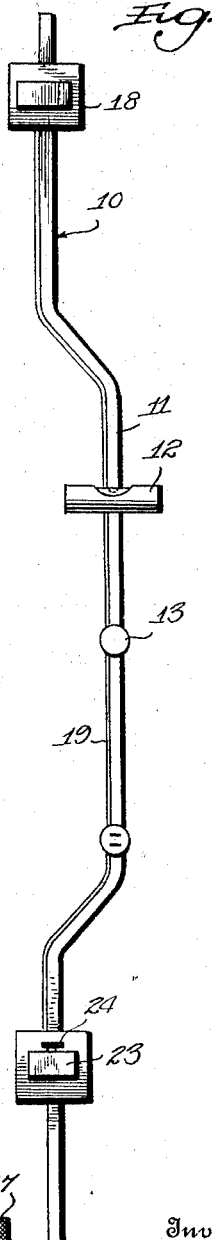
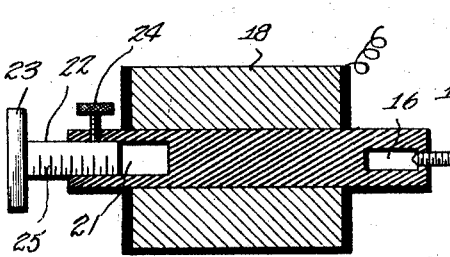
Inventor
A. S. KNOX Patented May 14, 1929.

1,712,889

UNITED STATES PATENT OFFICE.

ARTHUR S. KNOX, OF GLENDALE, CALIFORNIA, ASSIGNOR, BY MESNE ASSIGNMENTS, TO E. RICHARD JUST.

CAMBER-MEASURING DEVICE.

Application filed December 5, 1927. Serial No. 237,889.

This invention relates to camber measuring devices.

As is well known, it is the common practice to incline the front wheels of a motor vehicle from the vertical to properly place the load with respect to the king bolts of the wheels, and the present invention contemplates novel means for measuring the inclination or camber of the wheels.

An important object of the invention is to provide a body adapted to be vertically arranged adjacent one of the front wheels of the vehicle and provided with relatively movable means adapted to contact with the wheel whereby the inclination of the latter may be determined.

A further object is to provide a device of the character referred to wherein the body is provided with means for indicating when it is in a true vertical position whereby the position of the relatively movable members will indicate the camber of the wheel.

A further object is to provide novel electro-magnetic means for retaining the device in position on the wheel.

A further object is to provide a body portion adapted to be substantially vertically arranged and having electro-magnetic members associated therewith and vertically slidable thereon to permit them to be adjusted according to the diameter of the wheel, one of the electro-magnetic members having a laterally slidable camber measuring member associated therewith.

Other objects and advantages of the invention will become apparent during the course of the following description.

In the drawings I have shown one embodiment of the invention. In this showing,

Figure 1 is an edge view,

Figure 2 is a side elevation, and,

Figure 3 is a detail section on line 3—3 of Figure 1.

Referring to the drawings, the numeral 10 designates the body portion of the device which may be formed of suitable square, round or similar metal stock. The ends of the body portion are arranged in alinement with each other, as shown, while the central portion 11 is offset so as not to interfere with the hub of the wheel, as will be obvious. The body is provided with suitable spirit levels 12 and 13 which permit the body to be arranged accurately in a vertical position when the device is in operation. Slides 14 and 15 are arranged on the opposite ends of the body, each of these slides being provided with a slot 16 through which the end portions of the body extend. The thumb screw 17 is associated with each slide to clamp it in selected positions on the body. Each of the slides constitutes the core of an electro-magnet 18 adapted to be supplied with current through wires 19, these wires leading to an attachment plug 20 of any desired kind.

The slide or core 14 is preferably integral, and obviously is fixed against lateral movement with respect to the body 10. The slide 15 is provided in one end with a recess 21 slidably receiving the shank 22 of a contact member 23, the latter member and its shank forming a continuation of the core with which it is associated and adapted to be magnetically energized when current is passed through the coil 18. A set screw 24 is adapted to retain the shank 22 in position and the shank is provided with suitable indicia 25 preferably calibrated in inches and fractions thereof.

The operation of the device is as follows:

The set screws 17 are loosened and the slides are moved on the body until the inner ends thereof are spaced apart a distance equal to the diameter of the metal felly of the wheel. The set screws referred to are then tightened whereupon the electro-magnets are energized. The contact member 23 and the inner end of the core 14 are then placed against the top and bottom portions of the felly, the cores acting as electro-magnets to support the device in position. The thumb screw 24 is loosened and the body is moved in any direction until the spirit levels indicate that the body is accurately arranged in vertical position. The thumb screw 24 is then tightened, and the camber or degree of inclination of the wheel is indicated by the calibrations 25. It will be apparent that the electro-magnetic means described operates efficiently to support the device in position while the measuring operation is taking place, and the camber of the wheel readily may be determined. The device may be detached from the wheel merely by disconnecting the plug 20 to deenergize the electro-magnets.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:—

1. A device of the character described comprising a body, a pair of contact elements carried by said body, electro-magnetic means for maintaining said elements in engagement with diametrically opposite portions of a wheel, a level carried by said body for determining the vertical position thereof, one of said elements being fixed and the other laterally movable with respect to said body whereby it may remain in contact with the wheel while said body is moved to assume a vertical position, and means for indicating the position of said movable element with respect to said body.

2. A device of the character described comprising a body having alined end portions adapted to be vertically arranged adjacent a wheel mounted upon a vehicle, a pair of magnetic cores carried by said end portions and projecting laterally therefrom, coils surrounding said cores, one of said cores being provided in its end with an axial recess, and a contact member slidable in said recess, the end of said member and the end of the other core being adapted to engage and remain in position against diametrically opposite portions of the wheel, the portion of said contact member which is slidable in said recess being provided with a scale.

3. A device of the character described comprising a body having alined end portions and a laterally offset central portion, a pair of cores provided with slots slidably receiving the end portions of said body, means for retaining said cores in selected positions on said body, a coil surrounding each of said cores, one of said cores being provided with an axial recess, a contact member having a shank slidable in said recess, means for securing said shank against movement, and a scale carried by said shank and coacting with the adjacent end of the corresponding core, said contact member and the end of the other core being adapted to engage diametrically opposite portions of a wheel mounted upon a vehicle.

4. A device of the character described comprising a body having alined end portions and a laterally offset central portion, a pair of cores each provided in one end with a slot slidably receiving one end portion of said body, means for retaining said cores in selected positions on said body, said body being adapted to be vertically arranged adjacent a wheel mounted upon a vehicle, a pair of spirit levels carried by said body and arranged at right angles to each other, a coil surrounding each of said cores, one of said cores being provided with an axial recess, a contact member having a shank slidable in said recess, and a scale carried by said shank and coacting with the adjacent end of the corresponding core, said contact member and the end of the other core being adapted to engage diametrically opposite portions of the wheel.

In testimony whereof I affix my signature.

ARTHUR S. KNOX.